(12) United States Patent
Tsumemitsu

(10) Patent No.: US 11,941,136 B2
(45) Date of Patent: Mar. 26, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Masaya Tsumemitsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 275 days.

(21) Appl. No.: 17/011,322

(22) Filed: Sep. 3, 2020

(65) Prior Publication Data
US 2021/0294912 A1  Sep. 23, 2021

(30) Foreign Application Priority Data
Mar. 19, 2020 (JP) .................. 2020-049464

(51) Int. Cl.
G06F 21/00 (2013.01)
G06F 3/14 (2006.01)
G06F 16/13 (2019.01)
G06F 21/62 (2013.01)

(52) U.S. Cl.
CPC ............ *G06F 21/6218* (2013.01); *G06F 3/14* (2013.01); *G06F 16/13* (2019.01)

(58) Field of Classification Search
CPC ......... G06F 21/6218; G06F 16/13; G06F 3/14
See application file for complete search history.

(56) References Cited

U.S. PATENT DOCUMENTS

| | | | |
|---|---|---|---|
| 2012/0151380 A1* | 6/2012 | Bishop | G06F 16/168 715/752 |
| 2013/0151638 A1 | 6/2013 | Chen | |
| 2018/0124155 A1* | 5/2018 | Ryzhkov | G06Q 10/10 |
| 2020/0004783 A1* | 1/2020 | Micucci | H04L 63/08 |
| 2020/0067860 A1* | 2/2020 | Zhang | H04L 51/04 |

FOREIGN PATENT DOCUMENTS

| | | | | |
|---|---|---|---|---|
| CA | 2428956 | * | 5/2003 | ............ G06F 17/00 |
| JP | 2004-094615 A | | 3/2004 | |
| JP | 2006-107520 A | | 4/2006 | |
| JP | 2007-065926 A | | 3/2007 | |
| JP | 2008-060885 A | | 3/2008 | |

(Continued)

OTHER PUBLICATIONS

Dec. 26, 2023 Office Action issued in Japanese Application No. 2020-049464.

*Primary Examiner* — Joseph P Hirl
*Assistant Examiner* — Chi D Nguy
(74) *Attorney, Agent, or Firm* — Oliff PLC

(57) ABSTRACT

An information processing apparatus includes a processor configured to control a display unit in such a manner that a first message, a second message, and storage-location candidate information are displayed on a screen of the display unit. The first message has been input and confirmed by an apparatus user or at least one different user. The apparatus user uses a terminal apparatus having the display unit. The second message has been input by the apparatus user and has not been confirmed. The storage-location candidate information indicates a storage location candidate of a file related to the first message or the second message.

16 Claims, 18 Drawing Sheets

(56) References Cited

FOREIGN PATENT DOCUMENTS

| JP | 2018-097862 A | 6/2018 |
| JP | 2019-159657 A | 9/2019 |
| JP | 2019-185620 A | 10/2019 |
| WO | 2005/093593 A1 | 10/2005 |
| WO | 2018/205577 A1 | 11/2018 |

* cited by examiner

|  | DXD | SWA | Smart Wired Accident | SPECIFICATION | APPEARANCE COUNT |
|---|---|---|---|---|---|
| DXD | – | 1 | 0 | 6 | 25 |
| SWA | – | – | 4 | 0 | 100 |
| Smart Wired Accident | – | – | – | 10 | 10 |
| SPECIFICATION | – | – | – | – | 16 |

'DXD' 'SWA' 'SmartWiredAccident'
'SPECIFICATION' 'FUNCTIONAL SPECIFICATION'

ND NON-TRANSITORY COMPUTER
INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-049464 filed Mar. 19, 2020.

BACKGROUND

(i) Technical Field

The present disclosure relates to an information processing apparatus and a non-transitory computer readable medium.

(ii) Related Art

In recent years, a message processing apparatus has been proposed in which, on a terminal apparatus of a certain user, the titles of document files, which seem to be unknown to the other users, are displayed preferentially (for example, see Japanese Unexamined Patent Application Publication No. 2019-185620).

The message processing apparatus discussed in Japanese Unexamined Patent Application Publication No. 2019-185620 includes a message display area, an extraction unit, a search unit, a calculation unit, and a display controller. When multiple users participate in a chat, in the message display area in the display screen of a terminal apparatus used by a first user among the users, messages, which have been input and confirmed by the users, are displayed. The extraction unit extracts keywords from the messages which have been input and confirmed by the first user. The search unit searches for document files related to the extracted keywords. The calculation unit calculates, for the retrieved document files, the degrees of association which are set higher as a second user other than the first user among the users is to be informed with a higher necessity. The display controller exerts control so that the titles of the document files are displayed in a title display area of the display screen of the terminal apparatus, which is used by the first user, in descending order of the degrees of association.

SUMMARY

Aspects of non-limiting embodiments of the present disclosure relate to an information processing apparatus and a non-transitory computer readable medium which enable a user to share files, which are related to messages exchanged among users, easily with the other users, compared with the case in which the storage location of the files is input to inform the other users of the storage location.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to control a display unit in such a manner that a first message, a second message, and storage-location candidate information are displayed on a screen of the display unit. The first message has been input and confirmed by an apparatus user or at least one different user. The apparatus user uses a terminal apparatus having the display unit. The second message has been input by the apparatus user and has not been confirmed. The storage-location candidate information indicates a storage location candidate of a file related to the first message or the second message.

BRIEF DESCRIPTION OF THE DRAWINGS

Exemplary embodiment of the present disclosure will be described in detail based on the following figures, wherein:

FIG. 3 is a diagram illustrating an exemplary keyword association-degree list;

FIG. 4 is a diagram illustrating an exemplary synonym dictionary;

DETAILED DESCRIPTION

Figure 1:
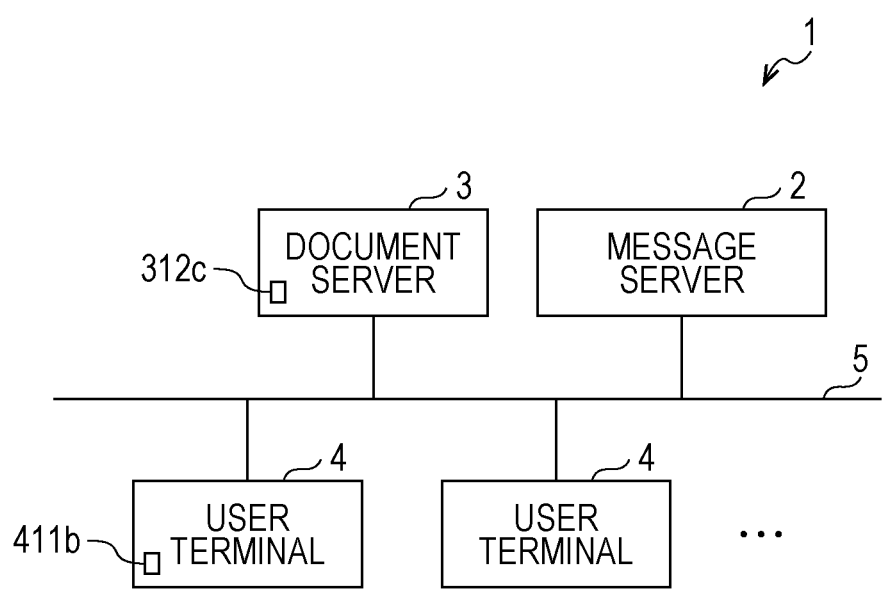
FIG. 1 is a diagram illustrating an exemplary configuration of an information processing system according to an exemplary embodiment of the present disclosure.

An exemplary embodiment of the present disclosure will be described below by referring to the drawings. In the figures, components having substantially identical functions are designated with identical reference characters, and repeated description will be avoided.

Summary of Exemplary Embodiment

An information processing apparatus according to the present exemplary embodiment includes a processor configured to control a display unit of a terminal apparatus, which is used by an apparatus user who uses the terminal apparatus, so that the following pieces of data are displayed on a screen of the display unit: first messages which have been input and confirmed by the apparatus user and at least one different user; a second message which has been input but has not been confirmed by the apparatus user; storage-location candidate information indicating a storage location candidate of a file related to the first messages or the second message.

The expression, "first messages or a second message", indicates one of the following meanings: only the first messages; only the second message; and the first messages and the second message. The case of only the first messages may indicate only messages, which have been posted by the apparatus user, among the first messages. The case of the first messages and the second message may indicate both the messages, which have been posted by the apparatus user, among the first messages and the second message.

Exemplary Embodiment

FIG. 1 is a diagram illustrating an exemplary configuration of an information processing system according to an exemplary embodiment of the present disclosure. An information processing system 1 includes a message server 2 which provides chat communication (hereinafter also referred to as a "chat"), a document server 3 which manages document files, and multiple user terminals 4 used by users. The message server 2, the document server 3, and the user terminals 4 are connected to each other over a network 5. The message server 2 is an exemplary information processing apparatus. Each user terminal 4 is an exemplary terminal apparatus.

The message server 2 and the document server 3 may be connected to each other over an intranet or the like, and may form a physically-single server. The message server 2 and the document server 3 may be regarded as an exemplary information processing apparatus.

Herein, a chat indicates real-time communication over a network. A business chat is a chat used in a company in most cases. A channel indicates chats dedicated for specific topics, or chats dedicated for specific organizations, such as departments and projects. A related-document file is a file, which is related to messages posted in a chat, among document files. A search keyword is a keyword, which is used in a search, among keywords extracted from messages.

Each user terminal 4 is, for example, a personal computer (abbreviated as a PC), a tablet terminal, or a multifunctional telephone (also referred to as a smartphone).

The network 5 is, for example, a communication network, such as a local-area network (LAN), a wide-area network (WAN), or the Internet, which receives/transmits data through wired communication, wireless communication, and the like.

Configuration of the Message Server

Figure 2:
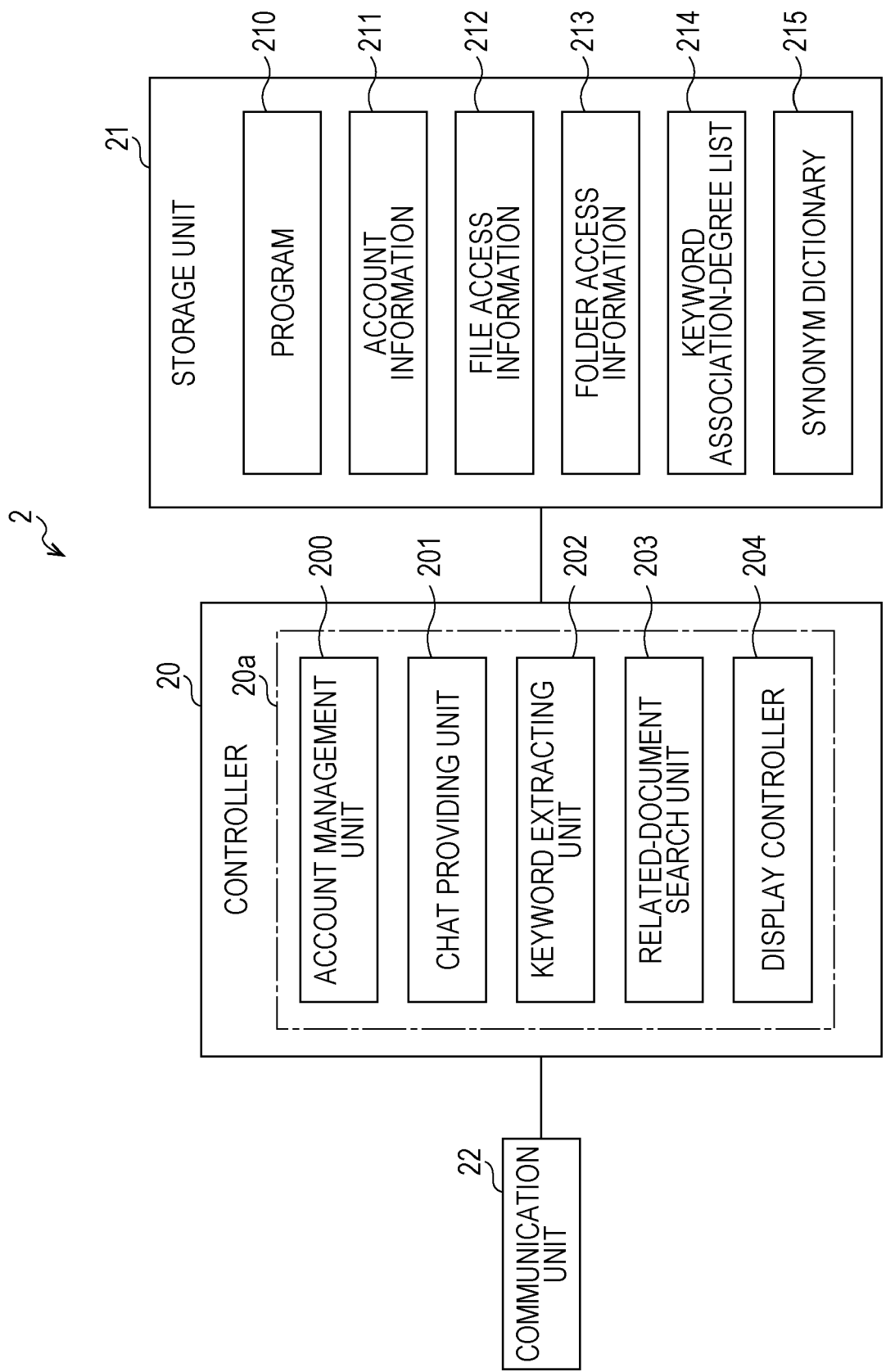
FIG. 2 is a block diagram illustrating an exemplary control system of a message server.

FIG. 2 is a block diagram illustrating an exemplary control system of the message server 2. The message server 2 includes a controller 20 which controls the units of the message server 2, a storage unit 21, and a communication unit 22.

The controller 20 includes a processor 20a such as a central processing unit (CPU) and an interface. The processor 20a executes a program 210 stored in the storage unit 21, thus functioning as an account management unit 200, a chat providing unit 201, a keyword extracting unit 202, a related-document search unit 203, a display controller 204, and the like.

The storage unit 21, which includes a read only memory (ROM), a random access memory (RAM), and a hard disk, stores the program 210 and various types of information, such as account information 211 including user IDs and passwords for identifying users, file access information 212, folder access information 213, a keyword association-degree list 214 (see FIG. 3), and a synonym dictionary 215 (see FIG. 4).

The file access information 212 includes document IDs for identifying documents, and access information for accessing the document files corresponding to the document IDs. The folder access information 213 includes access information for accessing folders as storage location candidates for document files. The access information indicates, for example, the uniform resource locator (URL) of a file or a folder.

The communication unit 22 receives/transmits information from/to external apparatuses, such as the document server 3 and the user terminals 4, over the network 5.

FIG. 3 is a diagram illustrating an exemplary keyword association-degree list 214. In the keyword association-degree list 214, multiple keywords and "appearance count" are arranged horizontally, and the multiple keywords are arranged vertically. The keyword association-degree list 214 describes, in its cells, the degrees of association between the keywords arranged horizontally and the keywords arranged vertically.

The degree of association indicates an index of association. The degree of association corresponds to, for example, how many times a keyword arranged horizontally and a keyword arranged vertically appeared together in a single chat (from the start to the end of a chat) in a channel. For example, in a single chat in a channel, "DXD" and "SWA" appeared together once. Thus, the keyword association-degree list 214 shows that the degree of association is "1". "DXD" and "specification" appeared together six times. Thus, the keyword association-degree list 214 shows that the degree of association is "6".

The "appearance count" indicates the count of appearance of each keyword, which is arranged vertically in the keyword association-degree list 214, in a channel. For example, FIG. 3 shows that the appearance count of "DXD" is 25. The appearance count may be a count in a single chat in a channel.

The keyword association-degree list 214 is generated by the keyword extracting unit 202. That is, the keyword extracting unit 202 obtains conversation logs in a channel, performs morphological analysis on the messages in the conversation logs, extracts nouns as keywords from the messages, and obtains the "appearance count" of the nouns, thus generating the keyword association-degree list 214. The keyword association-degree list 214 may be generated in real time during a chat, or may be generated on the basis of past chats.

A larger weighting coefficient may be attached to the appearance count of a keyword, which is extracted from the second message, than the appearance count of a keyword which is extracted from the first messages. A larger weighting coefficient may be attached to the latest message among the first messages. Alternatively, a combination of these may be used.

FIG. 4 is a diagram illustrating an exemplary synonym dictionary 215. FIG. 4 illustrates a part of the synonym dictionary 215. The words in the same line are set as synonyms. The synonym dictionary 215 is generated by the keyword extracting unit 202 on the basis of the keyword association-degree list 214. For example, as illustrated in FIG. 3, the degree of association between "DXD" and "SWA" is "1". The degree of association between "SWA" and "Smart Wired Accident" is "4". As illustrated in FIG. 4, the proper nouns, "DXD", "SWA", and "Smart Wired Accident", between which the degree of association is equal to or larger than a certain value (for example, 1), may be regarded as synonyms. FIG. 3 does not illustrate the degree of association between "specification" and "functional specification". A method, which is substantially the same, may be used to regard, as synonyms, the general nouns, "specification" and "functional specification", for which the degree of association is equal to or larger than the certain value.

The units 200 to 204 of the message server 2 will be described.

The account management unit 200 manages the accounts in the message server 2. Upon reception of an access request with a user ID and a password from a user terminal 4, the account management unit 200 permits participation in chat communication, which is provided by the chat providing unit 201, when the user ID and the password have been registered in the account information 211.

The chat providing unit 201 provides chat communication, transmits information of a chat screen 100 (see FIGS. 10 and 11), which is a Web page, to user terminals 4 having participated in the chat, and allows messages to be received/transmitted between multiple users.

The keyword extracting unit 202 generates the keyword association-degree list 214 and the synonym dictionary 215 as described above. The keyword extracting unit 202 extracts keywords from the first messages 111, which have been input to a message input field 120 of the chat screen 100 in FIGS. 10, 11, and the like described below and whose input has been confirmed, and extracts keywords from the second message 121 which has been input to the message input field 120 and which has not been confirmed.

Specifically, the keyword extracting unit 202 performs morphological analysis on first messages 111a, 111b, and 111c (hereinafter referred to as "first messages 111" when they are designated collectively) and the second message 121, and extracts nouns as keywords. The keyword extracting unit 202 specifies, as search keywords, keywords, whose appearance counts are equal to or larger than a certain value, on the basis of the keyword association-degree list 214. A first message 111 is an exemplary first message which has been input by an apparatus user or a different user and which has been confirmed. The second message 121 is an exemplary second message which has been input by an apparatus user and which has not been confirmed.

The related-document search unit 203 searches a document database (DB) 312 of the document server 3 and a storage unit 41 of a user terminal 4 on the basis of the search keywords specified by the keyword extracting unit 202, and obtains the file access information 212, which is used to access the document files obtained as the search results, with the document IDs. The related-document search unit 203 stores the obtained file access information 212 in association with the document IDs in the storage unit 21. In a search for document files, for example, the related-document search unit 203 searches for document files having file names including the search keywords. Alternatively, document files having document data including the search keywords may be searched for.

In a search for document files, the related-document search unit 203 transmits search instruction information (for example, a find command), including a search target and a search condition, to the document server 3 and a user terminal 4, and causes a storage unit 31 and the storage unit 41 to search document files. The search target indicates, for example, the file name of a document file. The search condition indicates, for example, that a file name includes a search keyword. A controller 30 of the document server 3 searches the document DB 312 of the storage unit 31, and transmits, to the message server 2, the file access information and the document IDs of the retrieved document file. The controller 40 of the user terminal 4 searches the storage unit 41, and transmits, to the message server 2, the file access information and the document IDs of the retrieved document files.

The display controller 204 displays the first messages 111, whose input has been confirmed, in a message display area 110, and displays the second message 121, which has been input and which has not been confirmed, in the message input field 120. The display controller 204 exerts control so that the file images, the file names, and file access information, which are associated with related-document files 312b and 411b retrieved by the related-document search unit 203, are displayed in a related-document display area 130. The display controller 204 exerts control so that a folder image 141, indicating a storage location candidate of the related-document files 312b and 411b, is displayed in the related-document display area 130. The folder image 141 is exemplary storage-location candidate information indicating a storage location candidate of related files.

When an operation of transmitting an instruction to store a file in the folder corresponding to the folder image 141 is performed, the display controller 204 exerts control so that the file is stored in the folder. The display controller 204 adds a folder name 142, which relates to the first messages 111 or the second message 121, to the folder in which the file is stored. After the file is stored in the folder, the display controller 204 exerts control so that folder access information 143 is displayed. The folder name 142 is exemplary attribute information related to the first messages or the second message.

Configuration of the Document Server

Figure 5:
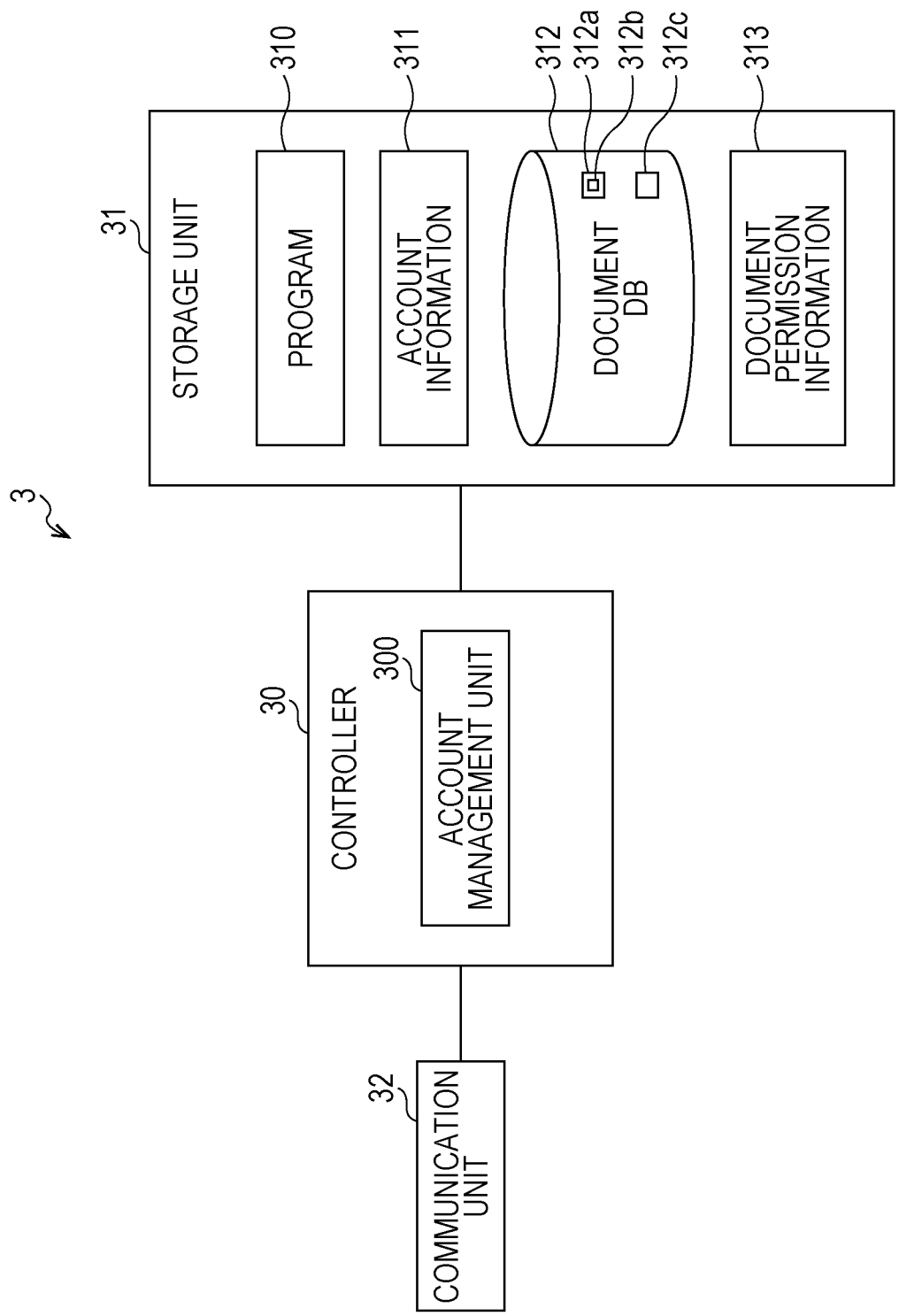
FIG. 5 is a block diagram illustrating an exemplary control system of a document server.

FIG. 5 is a block diagram illustrating an exemplary control system of the document server 3. The document server 3 includes the controller 30 which controls the units of the document server 3, the storage unit 31, and a communication unit 32. The storage unit 31 is an exemplary storage unit shared by the apparatus user and the different users.

The controller 30 includes a processor such as a CPU and an interface. The processor operates according to a program 310 stored in the storage unit 31, thus functioning as an account management unit 300 and the like.

The storage unit 31, which includes a ROM, a RAM, and a hard disk, stores the program 310 and various types of information, such as account information 311, which includes user IDs and passwords for identifying users, the document DB 312, and document permission information 313 (see FIG. 6) for document files 312a stored in the document DB 312. The document DB 312 is a database of documents managed by the document server 3.

The document DB 312 includes management information and the document files 312a corresponding to the management information. The management information includes document IDs for identifying document files, user IDs for identifying users who created the documents, creation dates and times at which the documents were created, and update dates and times at which the documents were updated. The document DB 312 also includes the retrieved related-document files 312b if the retrieved related-document files 312b have been retrieved as related documents from the document files 312a. The document DB 312 also includes folders (hereinafter also referred to as "storage-location candidate folders") 312c, which are storage location candidates of the related-document files 312b, if the folders 312c have been created. A storage-location candidate folder 312c is an exemplary candidate of file storage location.

The communication unit 32 receives/transmits information from/to external apparatuses, such as the message server 2 and the user terminals 4, over the network 5.

Figure 6:
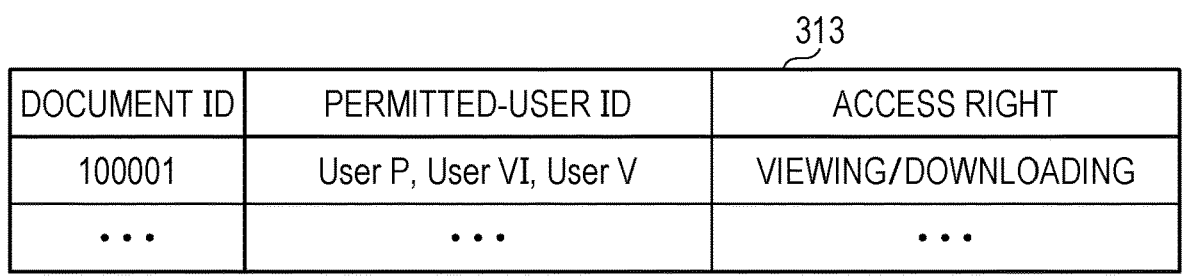
FIG. 6 is a diagram illustrating exemplary document permission information.

FIG. 6 is a diagram illustrating exemplary document permission information 313. The document permission information 313 has items, such as "document ID", "permitted-user ID", and "access right". In "document ID", document IDs for identifying documents are recorded. In "permitted-user ID", user IDs permitted to access the document file corresponding to the relevant document ID are recorded. In "access right", information about permitted access right is recorded. Examples of access right information include viewing, downloading, and writing. In the case of FIG. 6, in "permitted-user ID", three users, User P, User VI, and User X, are recorded.

The account management unit 300 manages the accounts in the document server 3. Upon reception of an access request with a user ID and a password from a user terminal 4, when the user ID and the password are registered in the account information 311, the account management unit 300 permits access to the document DB 312, and transmits, to the user terminal 4, information about a document storage setting screen 50B (see FIG. 9) which is a Web page. The account management unit 300 may manage the accounts in synchronization with the account management unit 200 of the message server 2.

The account management unit 300 refers to the document permission information 313 on the basis of a user ID and document IDs from a user terminal 4, and permits access to document files 312a and related-document files 312b which are stored in the document DB 312.

Configuration of a User Terminal

Figure 7:
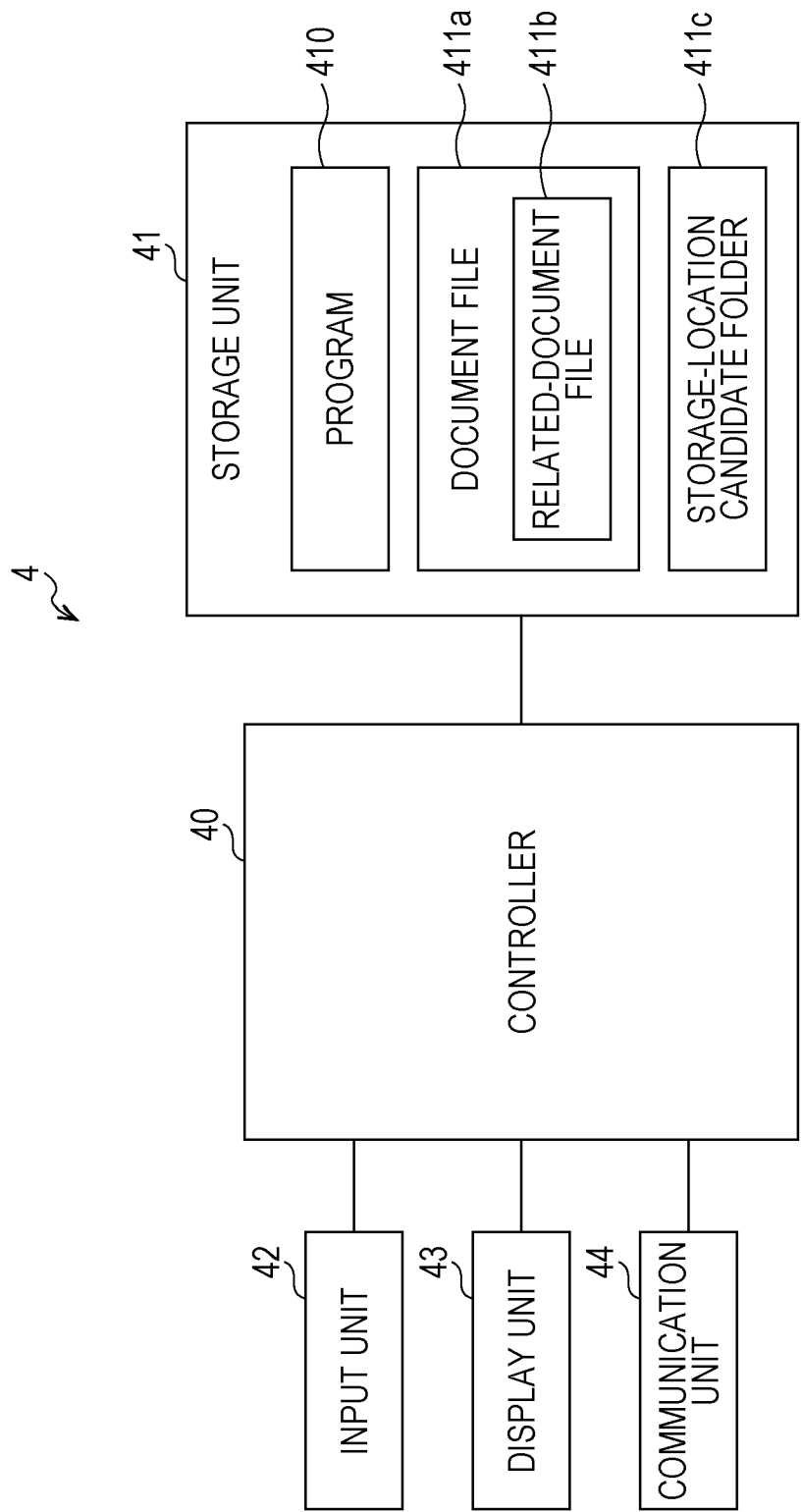
FIG. 7 is a block diagram illustrating an exemplary control system of a user terminal.

FIG. 7 is a block diagram illustrating an exemplary control system of a user terminal 4. The user terminal 4 includes a controller 40, the storage unit 41, an input unit 42, a display unit 43, and a communication unit 44. The controller 40 controls the units of the user terminal 4. The storage unit 41 stores various types of information. The input unit 42, such as a keyboard and a mouse, is used to input information. The display unit 43 such as a liquid-crystal display displays a Web page transmitted from the message server 2 or the document server 3. The communication unit 44 is connected to the network 5.

The storage unit 41, which includes a ROM, a RAM, and a hard disk, stores a program 410 including a Web browser, and various types of information such as document files 411a. A Web browser is used to view a Web page provided by the message server 2 or the document server 3. The document files 411a are stored, in the storage unit 41, with management information, such as the document IDs for identifying the document files, the user IDs who created the documents, the creation dates and times, and the update dates and times.

The storage unit 41 stores the related-document files 411b, if the related-document files 411b are retrieved as related documents. The storage unit 41 stores storage-location candidate folders 411c if the storage-location candidate folders 411c have been created. A storage-location candidate folder 411c is an exemplary candidate for file storage location.

The communication unit 44 receives/transmits information from/to external apparatuses, such as the message server 2 and the document server 3, over the network 5.

The controller 40 of the user terminal 4 accesses the message server 2 through a Web browser. Upon reception of input of a user ID and a password on a login screen for chat communication, the controller 40 transmits the user ID and the password to the message server 2. Upon reception of permission to participate in the chat, the controller 40 displays, on the display unit 43, a chat screen which is a Web page and which has been transmitted from the message server 2.

The controller 40 of the user terminal 4 accesses the document server 3 through the Web browser. Upon reception of input of a user ID and a password on the login screen, the controller 40 transmits the user ID and the password to the document server 3. Upon reception of permission to access the document DB 312, the controller 40 accesses the document DB 312 on the basis of a user operation.

Configuration of a Chat Screen

Figure 10:
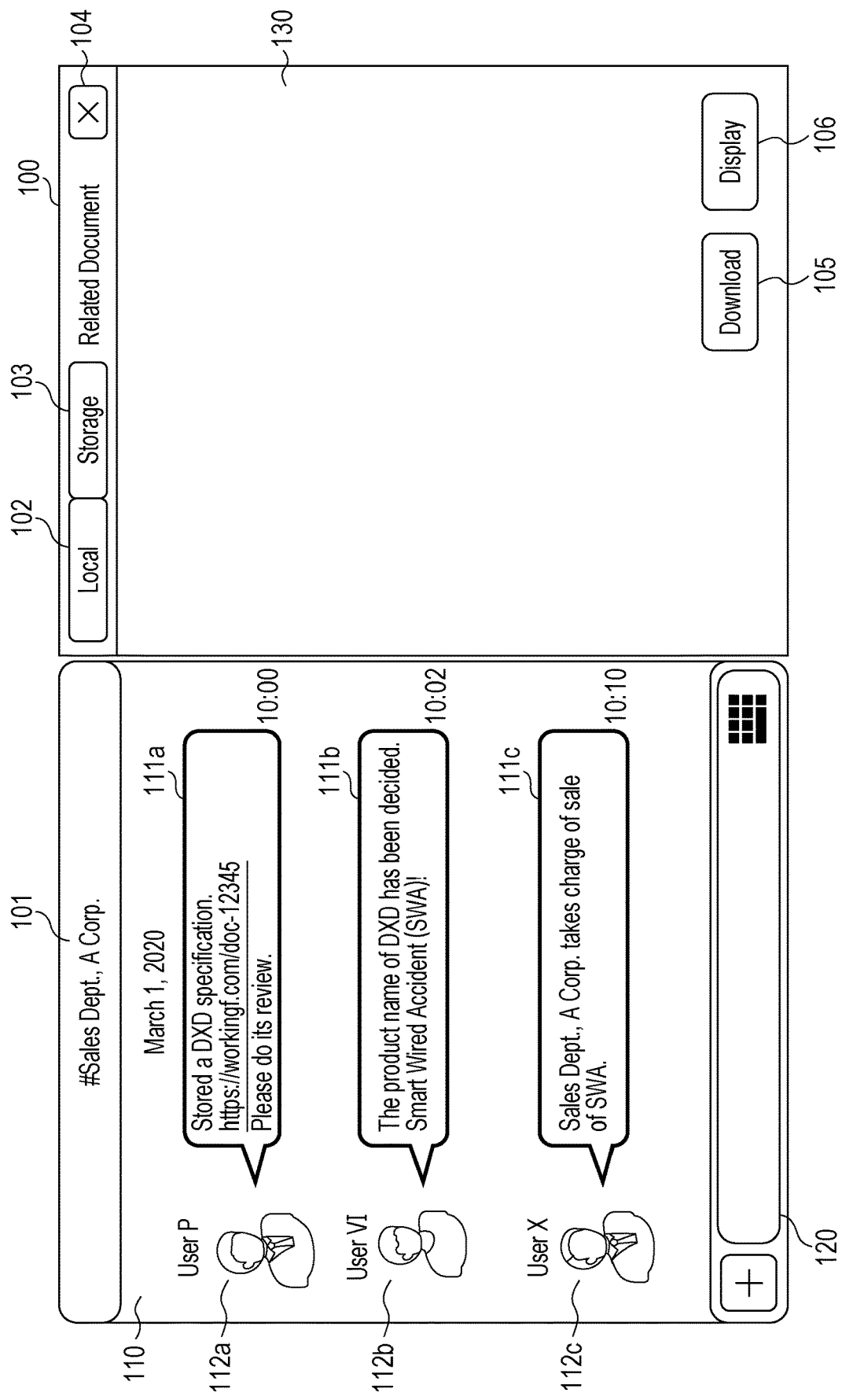
FIG. 10 is a diagram illustrating an exemplary chat screen.

FIG. 10 is a diagram illustrating an exemplary chat screen displayed on the display unit 43 of a user terminal 4. FIG. 10 illustrates an exemplary chat screen 100 displayed on the display unit 43 of a user terminal 4 (also referred to as the apparatus-user terminal 4) used by the apparatus user (for example, User Q). The chat screen 100 includes the message display area 110, the message input field 120, and the related-document display area 130. In the message display area 110, the conversation content is displayed as the first messages 111 in text. In the message input field 120, a message is input. In the related-document display area 130, for example, document files, which are related to keywords included in the first messages 111 displayed in the message display area 110 or a message which has been input in the message input field 120, and their storage location candidate are displayed.

The chat screen 100 also includes a department name 101, a "Local" button 102, a "Storage" button 103, a "Close" button 104, a "Download" button 105, and a "Display" button 106. The department name 101 indicates the affiliation of the user. The "Local" button 102 is used to display, for example, file images 131a and 131b (see FIG. 11) of related-document files 411b stored in the storage unit 41 of the apparatus-user terminal 4. The "Storage" button 103 is used to display, for example, the file images of related-document files 312b stored in the storage unit 31 of the document server 3. The "Close" button 104 is used to close the chat screen 100. The "Download" button 105 is used to transmit an instruction to download a file or a folder corresponding to a file image or a folder image displayed in the related-document display area 130. The "Display" button 106 is used to transmit an instruction to display the content of a related-document file 312b or 411b. Even without operations on the "Local" button 102 and the "Storage" button 103, the "Local" button 102 or the "Storage" button 103 may be selected automatically depending on whether the related-document files 312b or 411b are stored in "Local" or "Storage".

In the message display area 110, users' face images 112a to 112c and the first messages 111a to 111c created by the users are displayed. FIG. 10 illustrates the state in which three users, User P, User VI, and User X, participate in the chat. Assume that the user terminal 4 is used by User Q. User Q is an exemplary apparatus user. User P, User VI, and User X are exemplary different users.

In the message display area 110, content common to the users is displayed. When a message is input in the message input field 120 and a confirmation operation (for example, an operation on the "Enter" key on the keyboard) is performed, the message is displayed in the message display area 110 as a confirmed first message 111, and the message in the message input field 120 disappears. The content in the message display area 110 may be displayed in different forms depending on the users.

In the related-document display area 130, content specific to the user who uses the user terminal 4 is displayed. In the related-document display area 130, the file images of files, to which the user of the apparatus-user terminal 4 has access right, or the folder image of a folder is displayed.

Operations of the Information Processing System

Figure 15:
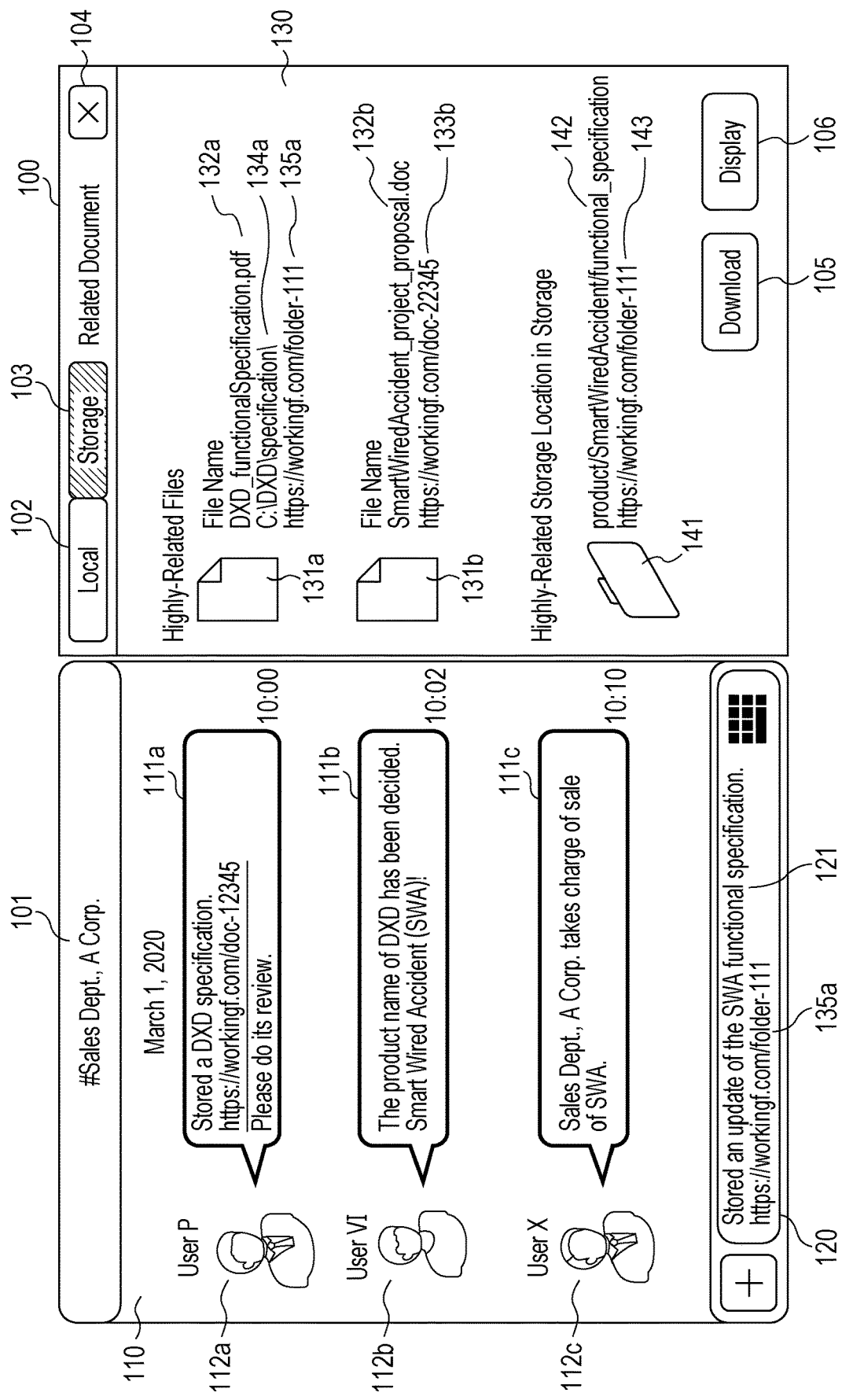
FIG. 15 is a diagram illustrating an exemplary chat screen.
Figure 16:
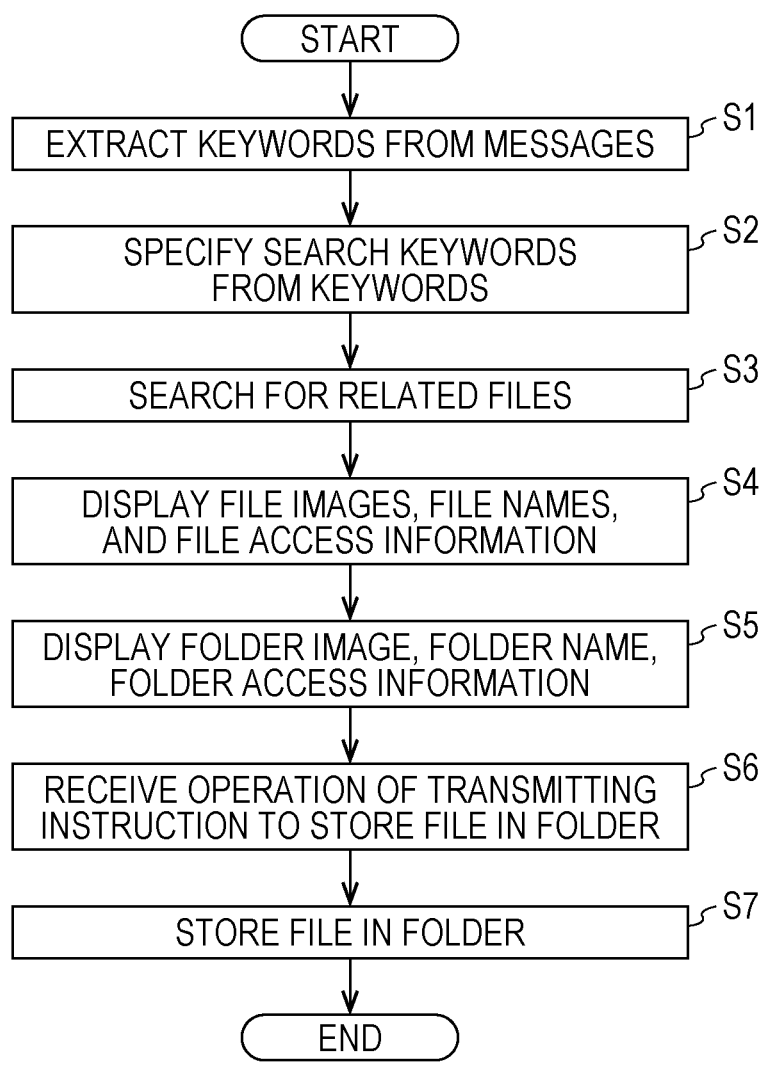
FIG. 16 is a flowchart of exemplary operations of an information processing system.

Exemplary operations of the information processing system 1 will be described by referring to FIGS. 8 to 16. FIG. 16 is a flowchart of exemplary operations of the information processing system 1.

(1) Connection Setting to the Message Server

A user operates the input unit 42 of the user terminal 4, and accesses the message server 2. In this example, assume that User Q accesses the message server 2.

The account management unit 200 of the message server 2 transmits, to the user terminal 4, information about a chat setting screen which serves as a login screen and which is a Web page. The controller 40 of the user terminal 4 displays the chat setting screen on the display unit 43.

Figure 8:
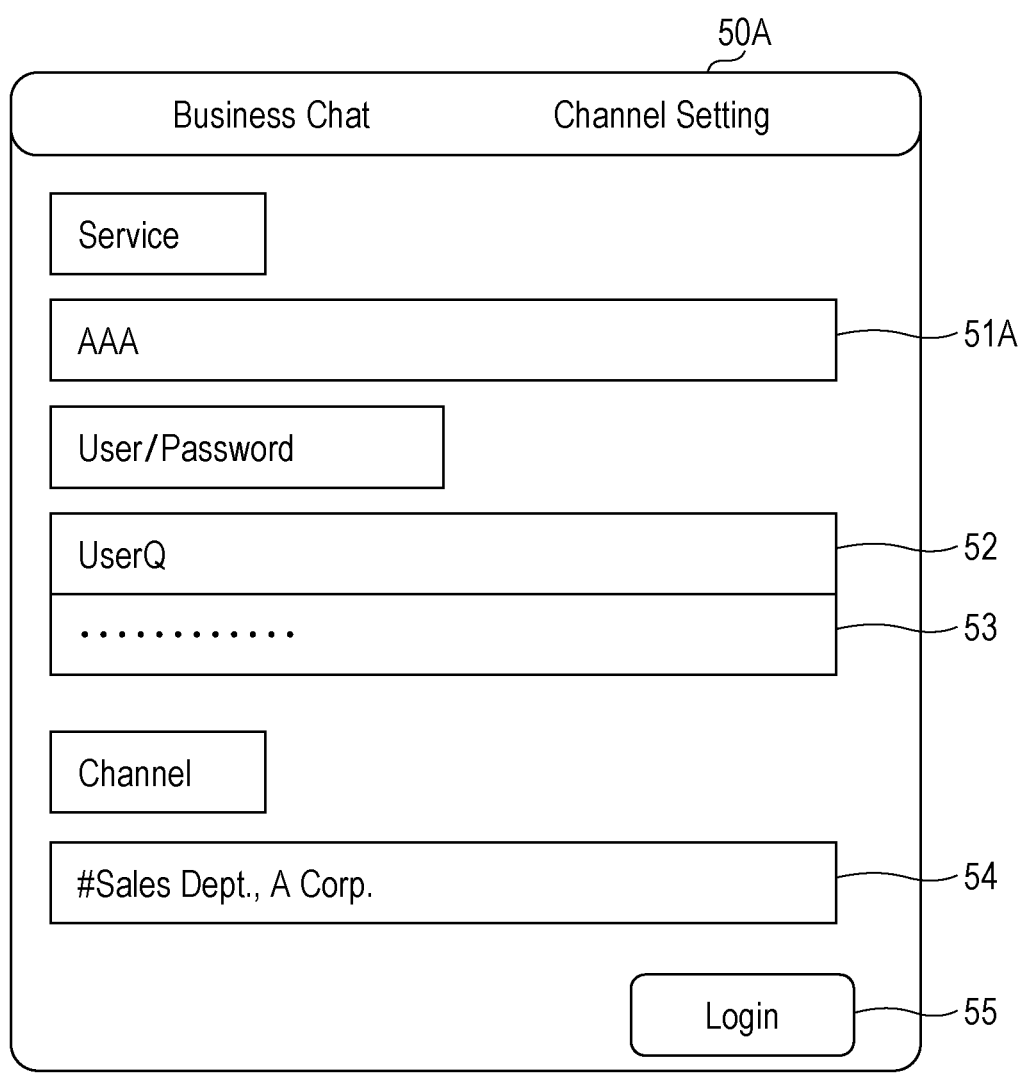
FIG. 8 is a diagram illustrating an exemplary chat setting screen.

FIG. 8 is a diagram illustrating an exemplary chat setting screen. A chat setting screen 50A has a service-name input field 51A, in which the service name of a business chat is input, the user-ID input field 52, in which a user ID is input, a password input field 53, in which a password is input, a channel-name input field 54, in which a channel name is input, and a "Login" button 55.

The user operates the input unit 42 of the user terminal 4 to input a service name (for example, AAA) in the service-name input field 51A, input the user ID (for example, User Q) in the user-ID input field 52, input the password in the password input field 53, input a channel name (for example, "#Sales Dept., A Corp.") in the channel-name input field 54, and operate the "Login" button 55. The controller 40 of the user terminal 4 transmits, to the message server 2, account information including the input user ID and password, and use information including the service name and the channel name.

When the user ID and the password which are transmitted from the user terminal 4 are registered in the account information 211, the account management unit 200 of the message server 2 permits use of the chat service. The chat providing unit 201 of the message server 2 transmits information about a chat screen corresponding to the use information transmitted from the user terminal 4, to User Q's user terminal 4 which is the access source. Assume that the different users, User P, User VI, and User X, other than User Q have accessed the message server 2 similarly.

(2) Connection Setting to the Document Server

A user operates the input unit 42 of the user terminal 4 to access the document server 3. In this example, assume that User Q accesses the document server 3.

The account management unit 300 of the document server 3 transmits, to the user terminal 4, information about a document storage setting screen which serves as a login screen and which is a Web page. The controller 40 of the user terminal 4 displays the document storage setting screen on the display unit 43.

Figure 9:
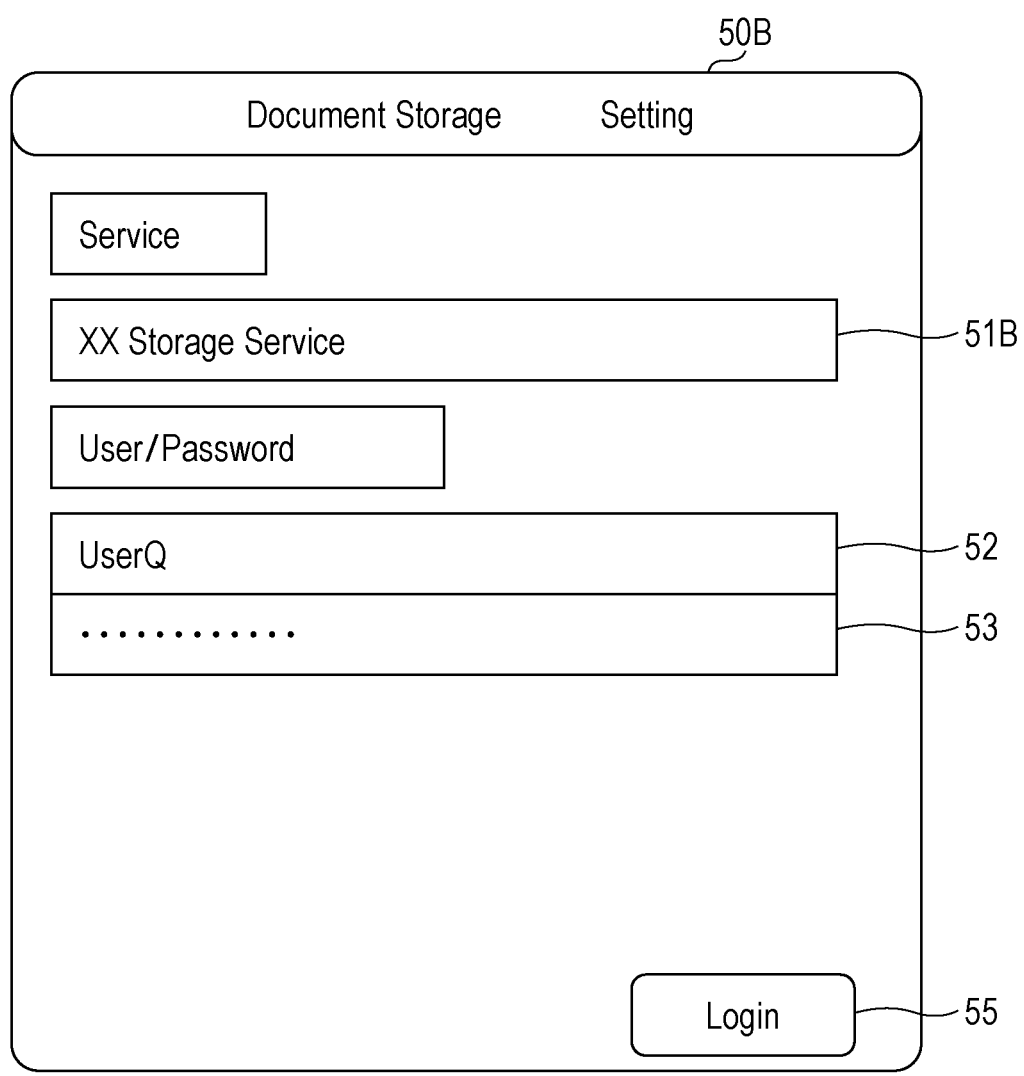
FIG. 9 is a diagram illustrating an exemplary document storage setting screen.

FIG. 9 is an exemplary document storage setting screen. The document storage setting screen 50B has a service-name input field 51B, in which a service name related to documents is input, a user-ID input field 52, in which a user ID is input, a password input field 53, in which a password is input, and a "Login" button 55.

The user operates the input unit 42 of the user terminal 4 to input a service name (for example, XX storage service) in the service-name input field 51B, input the user ID (for example, User Q) in the user-ID input field 52, input the password in the password input field 53, and operates the "Login" button 55. The controller 40 of the user terminal 4 transmits, to the document server 3, account information including the input user ID and password, and use information including the service name.

When the user ID and the password which are transmitted from the user terminal 4 are registered in the account information 311, the account management unit 300 of the document server 3 permits access to the document DB 312.

Assume that the different users, User P, User VI, and User X, other than User Q have accessed the document server 3 similarly.

(3) Start of a Chat

When, like User Q, the different users, User P, User VI, and User X, participate in the chat, the chat providing unit 201 transmits, to each user terminal 4, information about a chat screen which is a Web page and which illustrates the state of participation of multiple users. The controller 40 of each user terminal 4 displays a chat screen on the display unit 43.

(i) Input of Messages

FIG. 10 is a diagram illustrating an exemplary chat screen. FIG. 10 illustrates the case in which a chat screen is displayed on the display unit 43 of the user terminal 4 used by User Q. When User P, User VI, and User X input the first messages 111*a*, 111*b*, and 111*c*, respectively, a chat screen 100 in FIG. 10 is displayed on the display unit 43 of the user terminal 4 of User Q. The chat screen 100 in FIG. 10 indicates the state in which User P inputs "Stored a DXD specification. Please do its review." as the first message 111*a*; User VI inputs "The product name of DXD has been decided. Smart Wired Accident (SWA)!" as the first message 111*b*; User X inputs "Sales Dept., A Corp. takes charge of sale of SWA." as the first message 111*c*.

Figure 11:
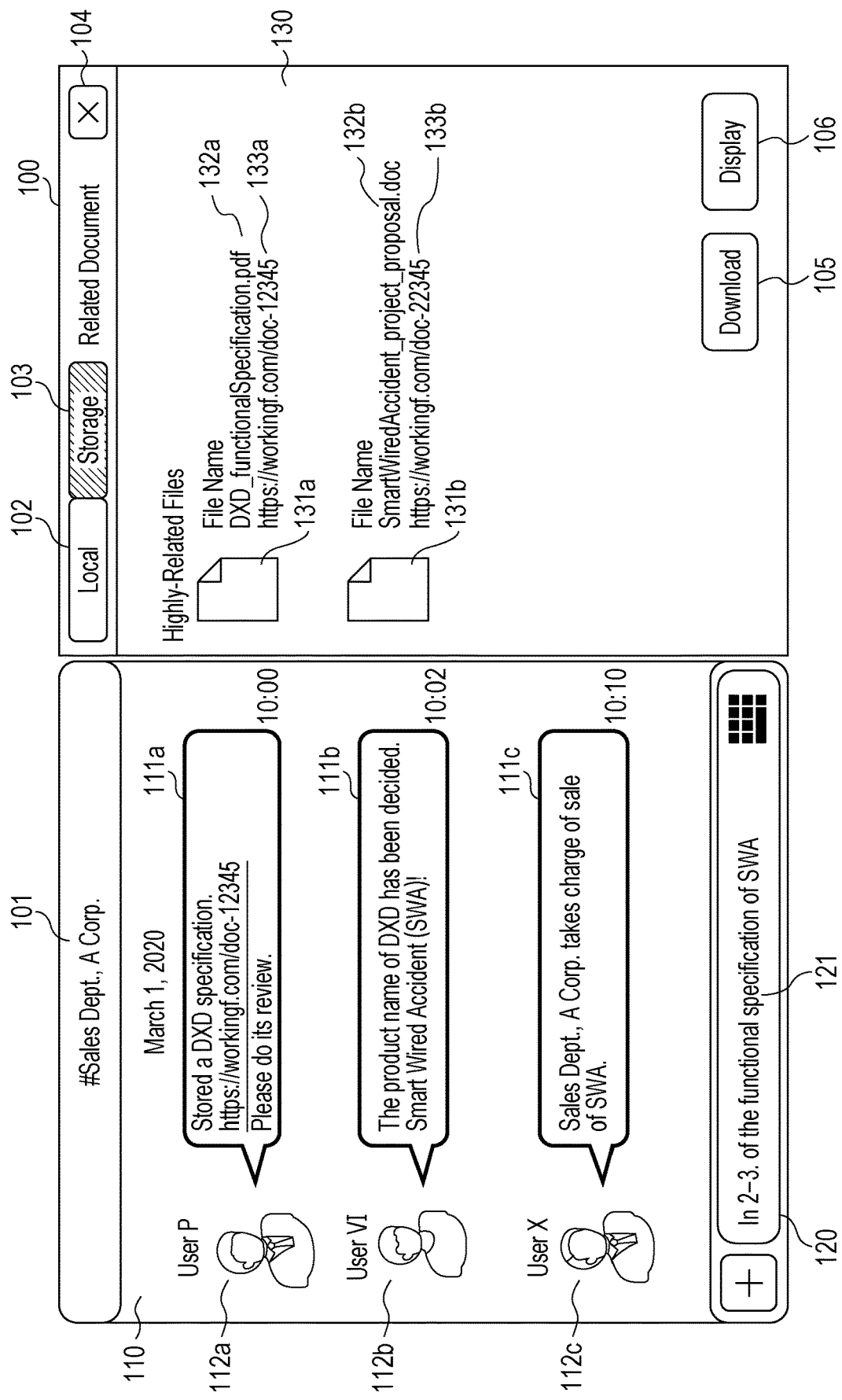
FIG. 11 is a diagram illustrating an exemplary chat screen.

As illustrated in FIG. 11, assume that User Q inputs "In 2-3. of the functional specification of SWA" as the second message 121 in the message input field 120. The controller 40 of the user terminal 4 transmits the second message 121 to the message server 2 even before a confirmation operation.

(ii) Extraction of Keywords

The keyword extracting unit 202 of the message server 2 performs morphological analysis on the first message 111*a* which has been input by User P, the first message 111*b* which has been input by User VI, the first message 111*c* which has been input by User X, and the second message 121 which has been input by User Q, and extracts keywords (for example, nouns) from the first messages 111*a* to 111*c* and the second message 121 (S1). In the morphological analysis, the first messages 111 and the second message 121 are decomposed into nouns, postpositional particles, auxiliary verbs, and the like.

For example, nouns, such as "DXD", "specification", and "review", are extracted as keywords from the first message 111*a* of User P, "Stored a DXD specification. Please do its review." Nouns, such as "DXD", "product name", "Smart Wired Accident", and "SWA", are extracted as keywords from the first message 111*b* of User VI, "The product name of DXD has been decided. Smart Wired Accident (SWA)!" Nouns, such as "SWA", "Sales Dept., A Corp.," "sale", and "charge", are extracted as keywords from the first message 111c of User X, "Sales Dept., A Corp. takes charge of sale of SWA." Nouns, such as "SWA", "functional specification", and "specification", are extracted as keywords from the second message 121 of User Q, "In 2-3. of the functional specification of SWA".

The keyword extracting unit 202 records the degrees of association and the appearance counts on the basis of the extracted keywords in the keyword association-degree list 214. The keyword extracting unit 202 updates the synonym dictionary 215 on the basis of the recorded content in the keyword association-degree list 214.

The keyword extracting unit 202 specifies, as search keywords, multiple keywords (for example, four keywords) in ascending order of appearance count on the basis of the item, "appearance count", of the keyword association-degree list 214. In the case of FIG. 3, search keywords, such as "SWA", "DXD", "specification", and "Smart Wired Accident", are extracted in this sequence.

(iii) Search for Document Files

The related-document search unit 203 searches the document DB 312 of the document server 3 and the user terminal 4 for document files having file names including the search keywords specified by the keyword extracting unit 202. The related-document search unit 203 obtains file access information of the related-document files, corresponding to the search result, with the document IDs, and stores the obtained data as the file access information 212 in the storage unit 21 (S3).

Specifically, for example, the related-document search unit 203 may perform a synonym search on the file names of the document files 411a, which are stored in the storage unit 41, by using the search keywords on the basis of the synonym dictionary 215, and may calculate, for the document files 411a which have had a hit as having synonyms, such degrees of preference that a larger value is set for a document file having the more recent update date and time. The related-document search unit 203 may specify, as the related-document files 411b, files having the degrees of preference equal to or larger than a certain value, and may store their file access information 212 in the storage unit 231. The synonym search indicates a search in which synonyms are also searched for. The synonym search may be performed on documents of the document files by using the search keywords. The degree of preference may be the number of search keywords included in a file name.

In response to the user's operation on the "Storage" button 103, the display controller 204 highlights the "Storage" 103. When the storage locations of the related-document files 312b are located in a storage in the storage unit 31 of the document server 3, as illustrated in FIG. 11, the display controller 204 displays the file images 131a and 131b and the like of the related-document files 312b in the related-document display area 130. In response to the user's operation on the "Local" button 102, the display controller 204 highlights the "Local" 102. When the storage locations of the related-document files 411b are located in a local area of the storage unit 41 of the user terminal 4, the display controller 204 displays the file images and the like of the related-document files in the related-document display area 130.

In the case of FIG. 11, two related-document files 312b (see FIGS. 1 and 5), one of which has a file name 132a, "DXD functionalSpecification", and the other of which has a file name 132b, "SmartWiredAccident project proposal", have been retrieved. The file name 132a includes a synonym (functional specification) of one search keyword (DXD) among the search keywords, "SWA", "DXD", "specification", and "Smart Wired Accident". The file name 132b includes one search keyword (Smart Wired Accident) among the search keywords, "SWA", "DXD", "specification", and "Smart Wired Accident".

On the basis of the file access information 212, the display controller 204 transmits, to the user terminal 4, the file image 131a, the file name 132a, file access information 133a, the file image 131b, the file name 132b, and file access information 133b which are associated with the retrieved related-document files 312b (see FIGS. 1 and 5) in the storage unit 31 of the document server 3. As illustrated in FIG. 11, the controller 40 of the user terminal 4 displays the file images 131a and 131b, the file names 132a and 132b, the file access information 133a and 133b in the related-document display area 130 (S4).

In display of the file images 131a and 131b in the related-document display area 130, the display controller 204 displays the file images 131a and 131b in descending order of the degree of preference, for example, from top to bottom.

(iv) Display of a Folder

Then, for example, the related-document search unit 203 performs a synonym search on the content of the document files 312a by using the content of the retrieved related-document files 312b. The related-document search unit 203 specifies the folder in the immediate upper layer of the folder containing the document file 312a, for which the hit count with the synonyms is the largest, as a storage location candidate. The related-document search unit 203 stores the folder access information 213 in the storage unit 21. When the document DB 312 does not have a tree structure of folders, the related-document search unit 203 specifies a folder from a part obtained by removing the file name from the path, and generates the folder access information 213 by adding a file name.

Figure 12:
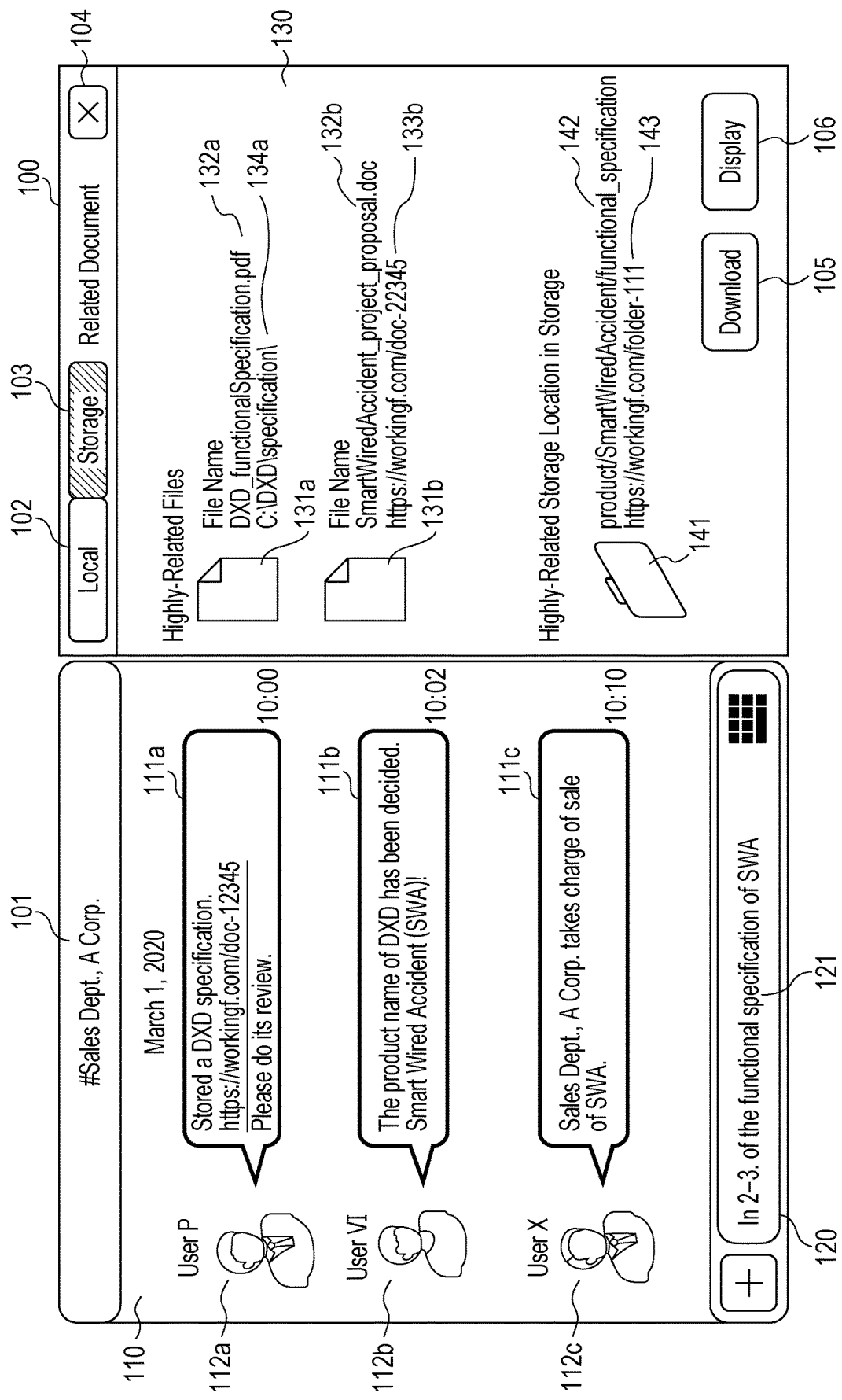
FIG. 12 is a diagram illustrating an exemplary chat screen.

The display controller 204 displays, on the basis of the folder access information 213, the folder image 141, the folder name 142, and the folder access information 143 in the related-document display area 130 as illustrated in FIG. 12 (S5). When the file image 131a of the related-document file is selected and the "Download" button 105 is clicked, the display controller 204 deletes the file access information 133a, generates a copied related-document file 411b and stores the copy in the storage unit 41 of the user terminal 4, which is a local storage, and displays copy information 134a indicating that the copied related-document file 411b has been generated. The download operation described above may be performed on more than one file image.

When a retrieved file is stored in the target apparatus, it is assumed that the file is to be shared with the different users. Thus, a storage, which is a folder that may be shared, is displayed as a storage location candidate in the related-document display area 130. In this case, the storage unit 41 of the user terminal 4 of the apparatus user is not displayed as a storage location candidate. This facilitates the user's selection of an appropriate folder in accordance with the purpose of sharing files.

Figure 13:
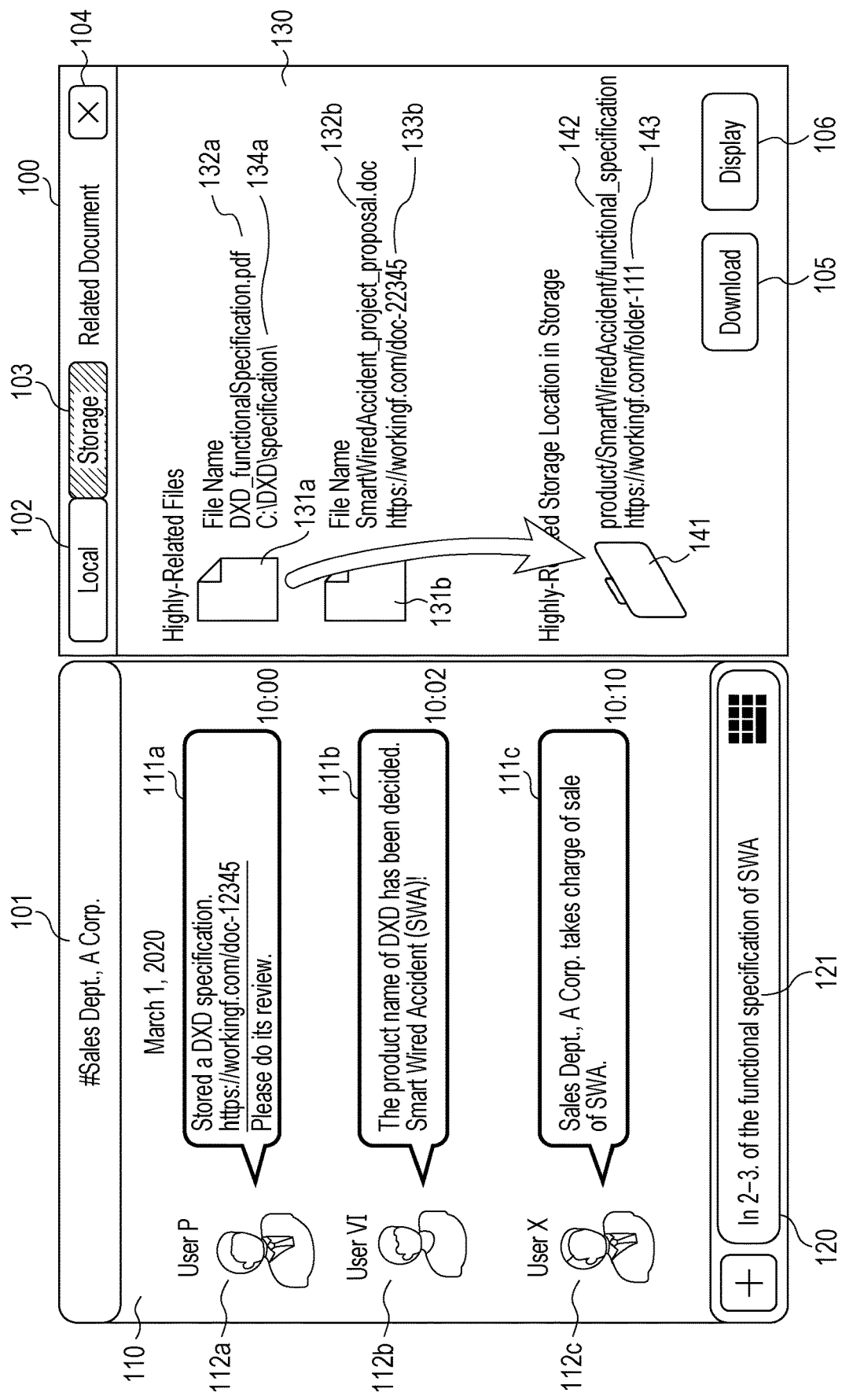
FIG. 13 is a diagram illustrating an exemplary chat screen.

Then, as illustrated in FIG. 13, User P performs an operation (dragging and dropping) to transmit an instruction to store the file, corresponding to the file image 131a, in the storage-location candidate folder 312c, corresponding to the folder image 141, on the chat screen 100 displayed on the display unit 43 of the user terminal 4 of the apparatus user (S6).

The related-document search unit 203 obtains the copied related-document file 411b which is stored in the storage unit 41 of the user terminal 4, and stores the copy in the storage-location candidate folder 312c of the storage unit 31 of the document server 3 (S7).

The display controller 204 adds an attribute (for example, the folder name) about messages, to the storage-location candidate folder 312c storing the copied related-document file 411b. The folder, to which the attribute about messages is added, is easily specified on the basis of the folder attribute.

Figure 14:
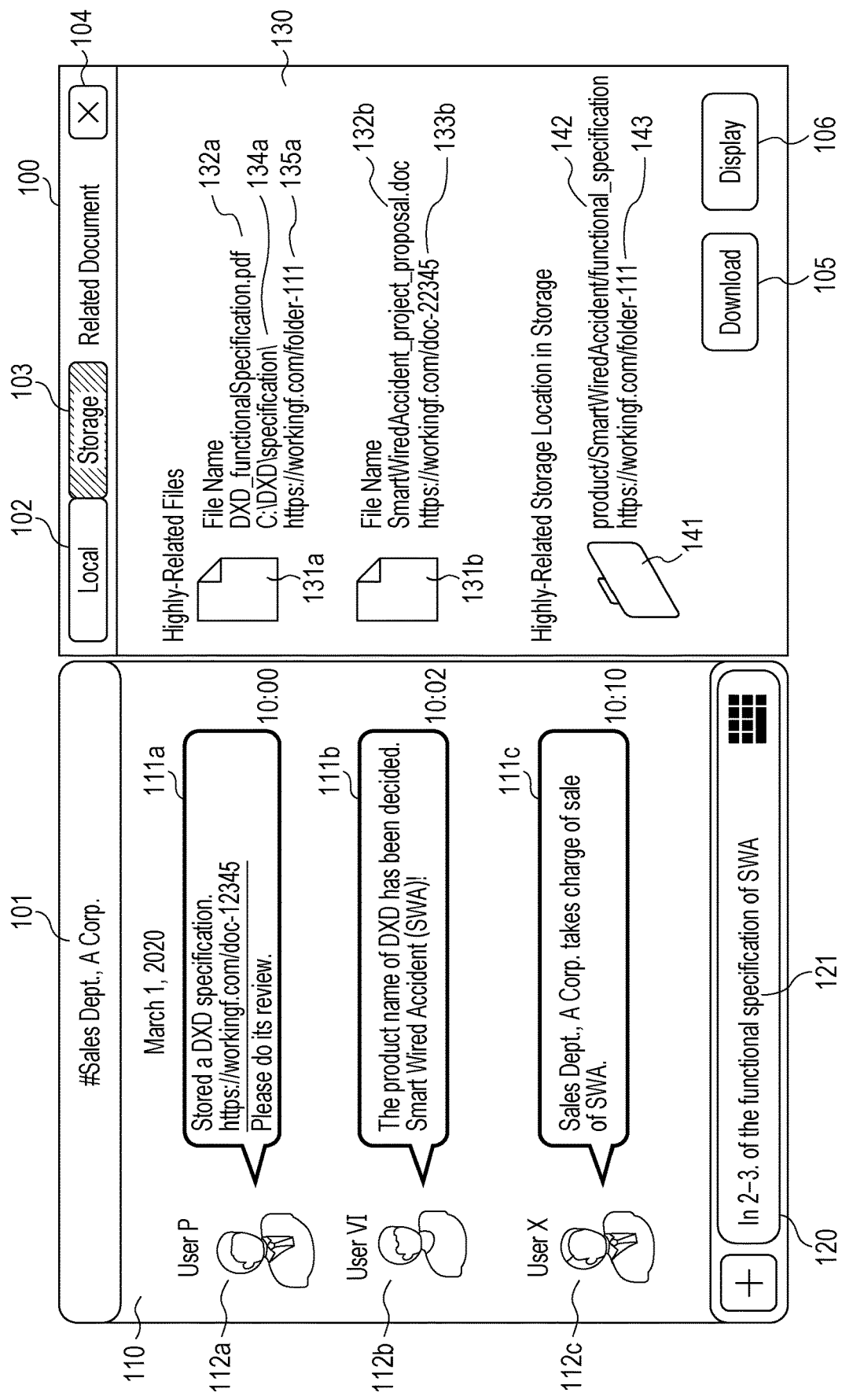
FIG. 14 is a diagram illustrating an exemplary chat screen.

As illustrated in FIG. 14, the display controller 204 displays folder access information 135a of the storage location in association with the file image 131a. When User Q performs an operation (dragging and dropping) for storing a document(s), which is displayed in the related-document display area 130, in the storage-location candidate folder 312c corresponding to the file image 141, as illustrated in FIG. 15, a copy, folder access information 135a, may be displayed in the message input field 120 of the chat screen 100 displayed on the display unit 43 of User Q's user terminal 4.

First Modified Example

Figure 17:
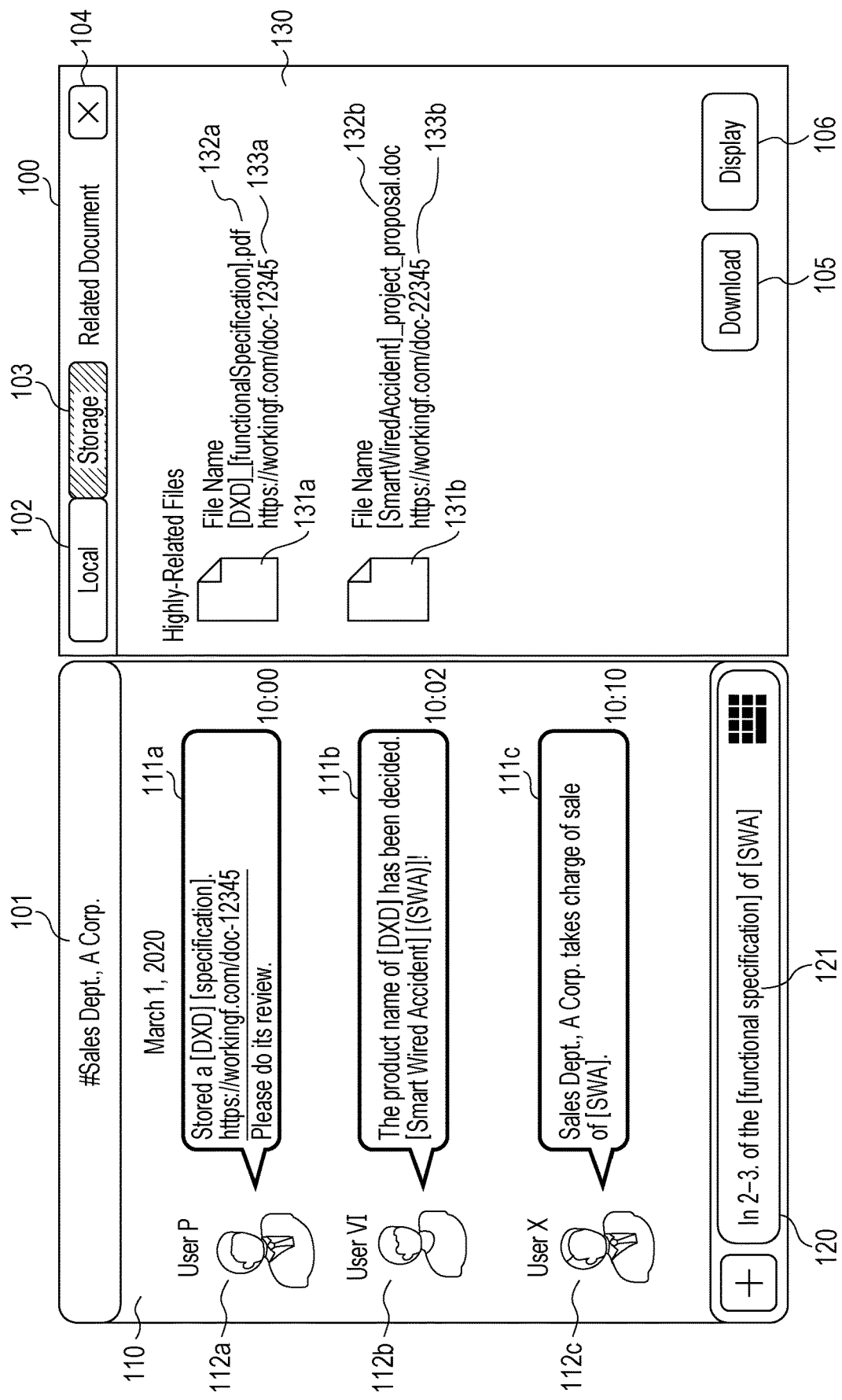
FIG. 17 is a diagram illustrating an exemplary chat screen according to a first modified example.

FIG. 17 is a diagram illustrating an exemplary chat screen 100 according to a first modified example. In FIG. 11, a user does not know which keywords are specified as search keywords in the messages 111 and 121. In contrast, as illustrated in FIG. 17, search keywords specified by the keyword extracting unit 202 may be displayed so as to be differentiated from the other strings.

The method for differentiation is, for example, the method of changing the attribute information (for example, color or font) of characters, and the method of illustrating the ranges (for example, parentheses or underlines).

In the case of FIG. 17, parentheses are added to the keywords, that is, "DXD" and "specification" in the first message 111a of User P in the message display area 110, "DXD", "Smart Wired Accident", and "SWA" in the first message 111b of User VI, and "SWA" and "functional specification" in the second message 121 of User Q, to differentiate the keywords from the other strings.

In addition, parentheses are added to the keywords, that is, "DXD" and "functional specification" in the file name 132a displayed in the related-document display area 130, and "Smart Wired Accident" in the file name 132b, to differentiate the keyword from the other strings.

Second Modified Example

Figure 18:
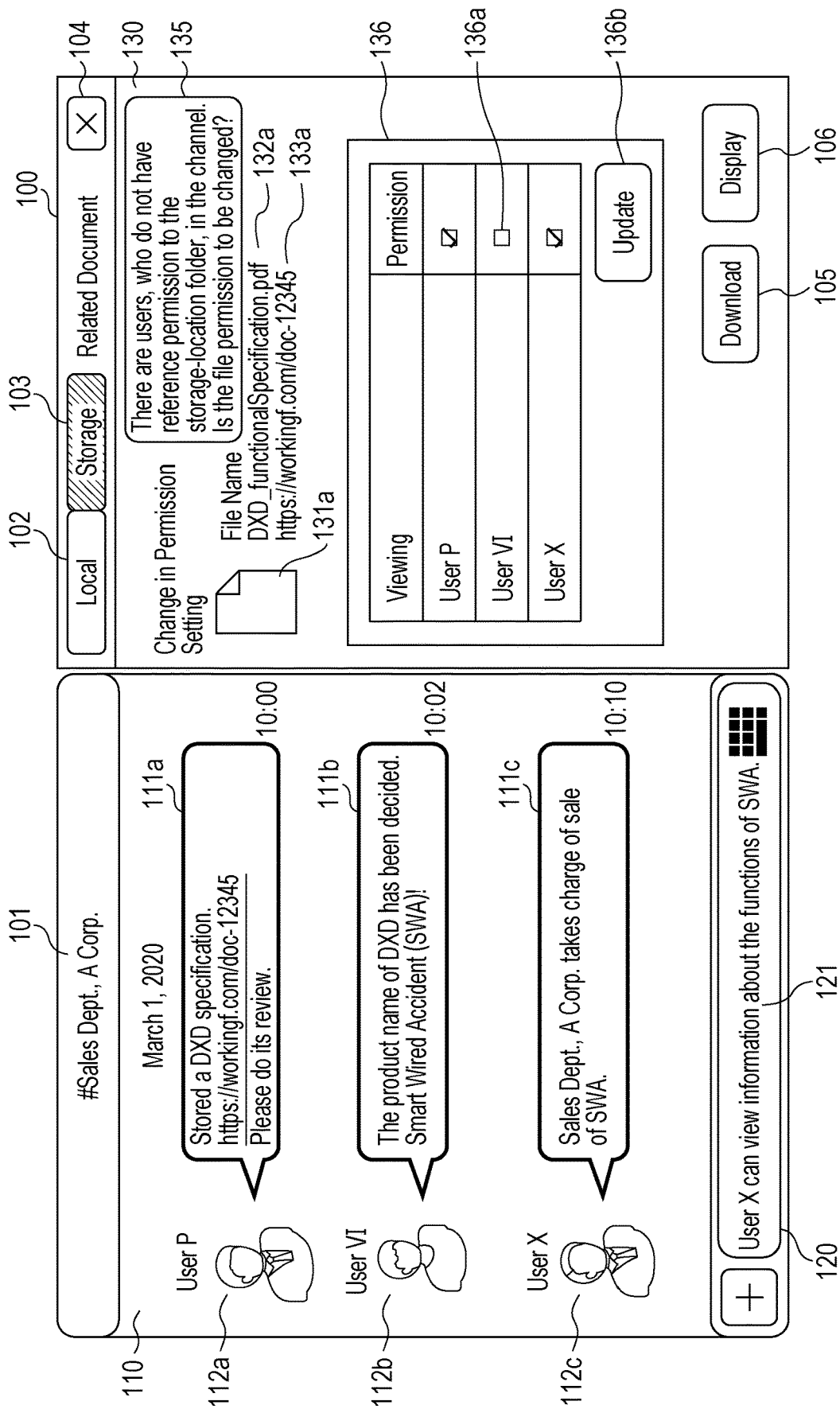
FIG. 18 is a diagram illustrating an exemplary chat screen according to a second modified example.

FIG. 18 is a diagram illustrating an exemplary chat screen according to a second modified example. When there is at least one user, who does not own access right to the storage-location candidate folder, among the different users other than User Q, the display controller 204 may notify User Q of the message indicating this. In this case, as illustrated in FIG. 18, the display controller 204 may receive setting or change of access right to the storage-location candidate folder, on the chat screen 100.

Specifically, as illustrated in FIG. 18, the display controller 204 displays, in the related-document display area 130 in the chat screen 100, a message 135, which indicates whether or not the permission for the storage-location candidate folder is to be changed, and an access right list 136. On the basis of the document permission information 313 of the document server 3, the display controller 204 displays information about access right which is currently registered in association with the document ID of the retrieved document file.

The access right list 136 has items, "view" which describes information about the access right and "permission" which indicates whether or not permission has been given, checkboxes 136a provided to the "permission" item, and an "Update" button 136b which is used to transmit an instruction to perform update.

Figure 19:
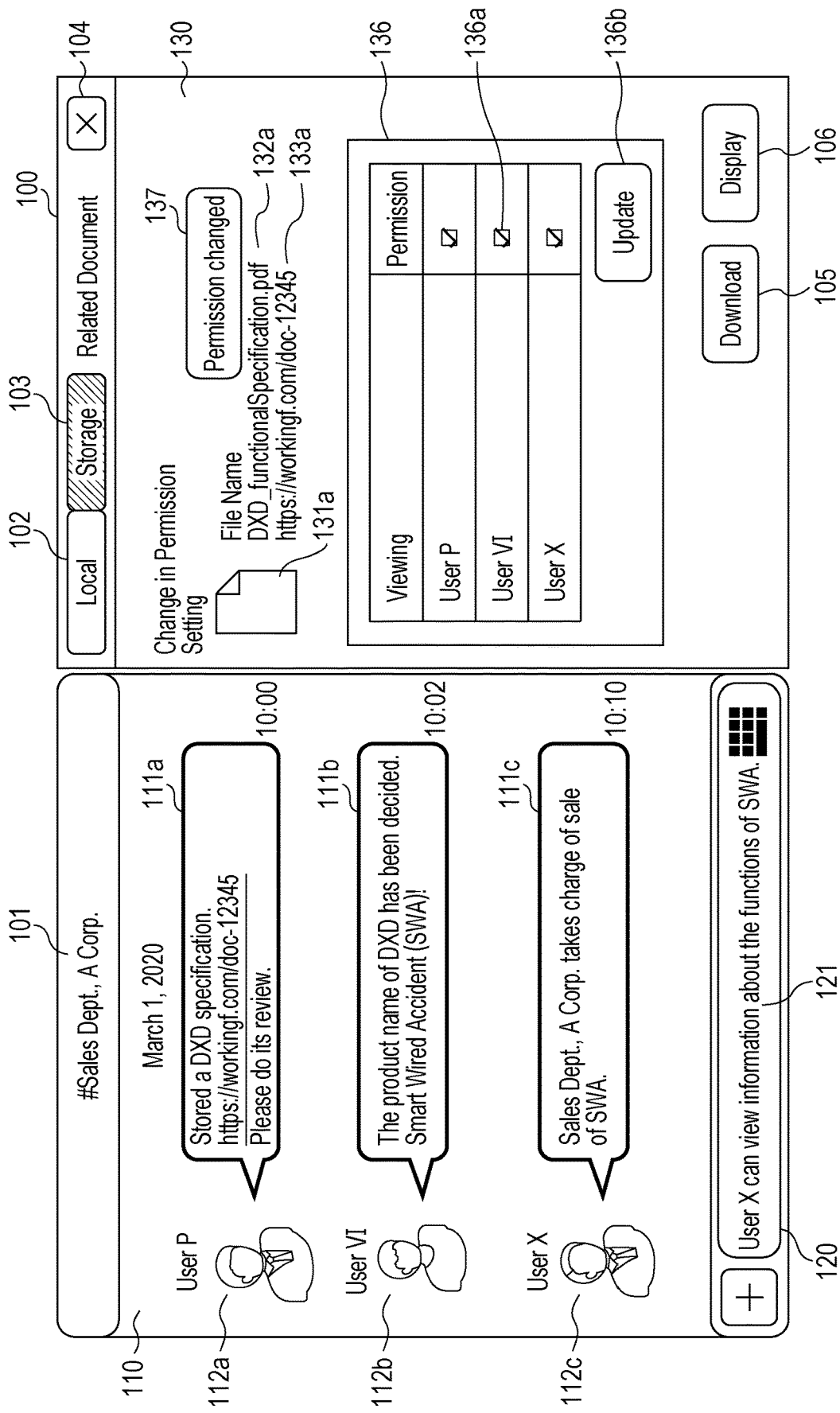
FIG. 19 is a diagram illustrating an exemplary chat screen according to the second modified example.

FIG. 18 illustrates the case in which User VI does not have viewing access right of the folder. As illustrated in FIG. 19, User Q puts a check in the checkbox 136a, and operates the "Update" button 136b. Thus, permission is given to User VI. As illustrated in FIG. 19, a right-changed message 137 indicating that permission has been changed is displayed.

The display controller 204 may receive, on the chat screen 100, an operation of changing the storage-location candidate folder to a folder to which all the different users are given access permission. The display controller 204 may receive, on the chat screen 100, setting or change of access right to the related-document file.

Third Modified Example

As the number of different users who may access the folder corresponding to a folder image is increased, the display controller 204 may exert control so that the folder image is preferentially displayed on the chat screen 100. In this case, compared with the case in which folder images are displayed randomly, the folder may be accessed easily.

Fourth Modified Example

In the case where the related-document files 312b are stored in the storage unit 32 of the document server 3, the display controller 204 may control the display unit 43 so that the folder image associated with a folder, which is stored in the storage unit 41 of the user terminal 4 of the apparatus user, as a storage location candidate is displayed on the chat screen 100. In the case where the related-document files are stored in the storage unit 32 of the document server 3, the related documents are highly likely to be shared between the users. The user is highly likely to want to store the related documents as copies in the storage area of the target apparatus, rather than storage of the related documents in a further different shared folder. Therefore, the user is allowed to store the related-document files in the storage area of the target apparatus immediately.

The exemplary embodiment of the present disclosure is described above. The exemplary embodiment of the present disclosure is not limited to the exemplary embodiment described above, and various changes may be made and carried out.

A part or the entirety of each unit of a processor may be formed of a hardware circuit, such as a field programmable gate array (FPGA) or an application specific integrated circuit (ASIC).

In the embodiment above, the term "processor" refers to hardware in a broad sense. Examples of the processor include general processors (e.g., CPU: Central Processing Unit), and dedicated processors (e.g., GPU: Graphics Processing Unit, ASIC, FPGA, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

Some of the components of the exemplary embodiment may be omitted or changed. In the flow according to the exemplary embodiment, for example, steps may be added, deleted, or replaced. A program used in the exemplary embodiment may be provided by recording the program in a computer-readable recording medium such as a compact disc-read-only memory (CD-ROM). The program may be stored in an external server such as a cloud server and may be used over a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
  a processor configured to
    control a display of a terminal apparatus so that a first message, a second message, and a proposed storage location are displayed, the first message having been input and confirmed by at least one different user other than an apparatus user using the terminal apparatus, the second message having been input by the apparatus user and having not been confirmed, the proposed storage location indicating a location that corresponds to a file related to the first message or the second message, wherein the processor is configured to determine the proposed storage location by analyzing content of the first message or the second message, and
    notify the at least one different user to indicate that the at least one different user does not have an access right to the proposed storage location when the at least one different user does not have the access right to the proposed storage location.

2. The information processing apparatus according to claim 1,
  wherein, when the file is stored in a storage unit of the terminal apparatus, the processor controls the display in such a manner that a folder is displayed as the proposed storage location on the display, the folder being shared by the apparatus user and the at least one different user.

3. The information processing apparatus according to claim 2,
  wherein, when an operation of transmitting an instruction to store the file in the folder corresponding to the proposed storage location is performed, the processor exerts control in such a manner that the file is stored in the folder.

4. The information processing apparatus according to claim 3,
  wherein the processor adds attribute information to the folder in which the file is stored, the attribute information being related to the first message or the second message.

5. The information processing apparatus according to claim 3,
  wherein, after the file is stored in the folder, the processor controls the display in such a manner that access information for accessing the folder is displayed on the display.

6. The information processing apparatus according to claim 1,
  wherein, when the file is stored in a folder shared by the apparatus user and the at least one different user, the processor controls the display in such a manner that a folder stored in the terminal apparatus is displayed as the proposed storage location on the display.

7. The information processing apparatus according to claim 6,
  wherein, when an operation of transmitting an instruction to store the file in the folder corresponding to the proposed storage location is performed, the processor exerts control in such a manner that the file is stored in the folder.

8. The information processing apparatus according to claim 7,
  wherein the processor adds attribute information to the folder in which the file is stored, the attribute information being related to the first message or the second message.

9. The information processing apparatus according to claim 1,
  wherein, when an operation of transmitting an instruction to store the file in a folder corresponding to the proposed storage location is performed, the processor exerts control in such a manner that the file is stored in the folder.

10. The information processing apparatus according to claim 9,
  wherein the processor adds attribute information to the folder in which the file is stored, the attribute information being related to the first message or the second message.

11. The information processing apparatus according to claim 7,
  wherein, after the file is stored in the folder, the processor controls the display in such a manner that access information for accessing the folder is displayed on the display.

12. The information processing apparatus according to claim 9,
  wherein, after the file is stored in the folder, the processor controls the display in such a manner that access information for accessing the folder is displayed on the display.

13. The information processing apparatus according to claim 1,
  wherein the processor makes it possible to receive, on the display, setting or changing access right to file or a folder.

14. The information processing apparatus according to claim 1,
  wherein the processor makes it possible to receive changing a folder corresponding to the proposed storage location to a folder to which each of the at least one different user has access right to the folder.

15. The information processing apparatus according to claim 1,
  wherein the processor controls the display in such a manner that a folder is preferentially displayed as the proposed storage location on the display, the folder that is preferentially displayed is a folder which a larger number of different users are capable of accessing.

16. A non-transitory computer readable medium storing a program causing a computer to execute a process comprising:

controlling a display of a terminal apparatus so that a first message, a second message, and a proposed storage location are displayed, the first message having been input and confirmed by a different user other than an apparatus user using the terminal apparatus, the second message having been input by the apparatus user and having not been confirmed, the proposed storage location indicating a location that corresponds to a file related to the first message or the second message, wherein the proposed storage location is determined by analyzing content of the first message or the second message, and notifying the different user to indicate that the different user does not have an access right to the proposed storage location when the different user does not have the access right to the proposed storage location.

* * * * *